(12) United States Patent
Degen et al.

(10) Patent No.: US 12,165,377 B2
(45) Date of Patent: Dec. 10, 2024

(54) ROI IMAGE WINDOWING

(71) Applicant: ZEBRA TECHNOLOGIES CORPORATION, Lincolnshire, IL (US)

(72) Inventors: Matthew M. Degen, Ridge, NY (US); Anthony P. DeLuca, Holbrook, NY (US); Adam Danielsen, Ronkonkoma, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 32 days.

(21) Appl. No.: 17/977,268

(22) Filed: Oct. 31, 2022

(65) Prior Publication Data

US 2024/0144632 A1 May 2, 2024

(51) Int. Cl.
*G06T 11/60* (2006.01)
*G06F 3/04842* (2022.01)
*G06V 10/25* (2022.01)
*G06V 10/94* (2022.01)

(52) U.S. Cl.
CPC .......... *G06V 10/25* (2022.01); *G06F 3/04842* (2013.01); *G06T 11/60* (2013.01); *G06V 10/945* (2022.01); *G06T 2200/24* (2013.01); *G06V 2201/06* (2022.01); *G06V 2201/10* (2022.01)

(58) Field of Classification Search
CPC .. G06V 10/25; G06V 10/945; G06V 2201/06; G06V 2201/10; G06F 3/04842; G06T 11/60; G06T 2200/24
See application file for complete search history.

(56) References Cited

U.S. PATENT DOCUMENTS

2017/0308869 A1* 10/2017 Reidinger .......... G06Q 10/0633
2023/0360271 A1* 11/2023 Jindal ....................... G06T 7/73

* cited by examiner

*Primary Examiner* — Chong Wu
(74) *Attorney, Agent, or Firm* — Yuri Astvatsaturov

(57) ABSTRACT

Imaging devices, systems, and methods for analyzing an image taken by an imaging system are described herein. An example method includes: receiving a bank image from the imaging device pursuant to one of a plurality of banks of imaging parameters; rendering the bank image in an image display; receiving an indication of a region of interest (ROI) in the image display associated with a user-selected tool; determining whether the user-selected tool is set to use the bank image, an output of a parent tool, or an output of the user-selected tool; and generating, in the image display, at least a portion of a display image in the ROI representative of: (i) the bank image, (ii) the output of the parent tool, or (iii) the output of the user-selected tool; wherein the portion of the display image is associated with the user-selected region.

26 Claims, 8 Drawing Sheets

ROI IMAGE WINDOWING

BACKGROUND

Over the years, industrial automation has come to rely heavily on machine vision components capable of assisting operators in a wide variety of tasks. In some implementations, machine vision components, like cameras, are utilized to track objects passing objects, like those which move on conveyor belts past stationary cameras. Often these cameras, along with the backend software, are used to capture a variety of parameters associated with the passing items. To do this, the software is configured with a job which includes a series of tools that are executing during each job execution. Subsequently, as items (e.g., boxes) pass within the field of view (FOV) of the camera, a job is executed for each such item.

However, when analyzing images from an imaging system different tools operate best on different images, filters, etc. To properly utilize and understand the output of each tool, a user perform an image analysis job switches between images and/or views for each tool. However, switching between images requires increased time from both the user and the imaging system as well as increased processing power and resources. Displaying multiple images simultaneously similarly drains computer resources and power. Similarly, attempting to disregard some images may cause a tool to display results incongruous with what the user actually sees.

As such, there is a need for improved systems, methods, and devices directed towards generating visual information representative of a job for a user.

SUMMARY

In an embodiment, a method for analyzing an image taken by a fixed industrial scanner system, the fixed industrial scanner system including a computing device executing an application and an imaging device communicatively coupled to the computing device is provided. The method includes: (A) receiving a bank image from the imaging device pursuant to one of a plurality of banks of imaging parameters, each of the plurality of banks of imaging parameters being different from each other of the plurality of banks of imaging parameters; (B) rendering the bank image in an image display; (C) receiving an indication of a region of interest (ROI) in the image display associated with a user-selected tool, the ROI encapsulating a region of the image display; (D) determining whether the user-selected tool is set to use the bank image, an output of a parent tool, or an output of the user-selected tool; and (E) generating, in the image display, at least a portion of a display image in the ROI representative of: (i) the bank image when the user-selected tool is set to use the bank image, (ii) the output of the parent tool when the user-selected tool is set to use the output of the parent tool, or (iii) the output of the user-selected tool when the user-selected tool is set to use the output of the user-selected tool; wherein the portion of the display image is associated with the user-selected region.

In a variation of the embodiment, the method further comprises: rendering visual metadata generated by the user-selected tool such that the visual metadata overlays the output of the parent tool or the bank image.

In further variation of the embodiment, the user-selected tool is at least one of an edge tool, a pixel count tool, or a blob tool.

In another variation of the embodiment, the method further comprises: determining that the ROI is at least partially outside of a tool boundary associated with the parent tool; and responsive to the determining, rendering the at least the portion of the display image in the ROI such that the display image is representative of: (a) the output of the parent tool within the tool boundary associated with the parent tool; and (b) the bank image outside of the tool boundary associated with the parent tool.

In yet another variation of the embodiment, the method further comprises: determining that the output of the parent tool or the output of the user-selected tool is not available; and generating, in the image display, at least a portion of a display image in the ROI representative of: (iv) an output of nearest ancestor tool when (a) the user-selected tool is set to use the output of the parent tool and the output of the parent tool is not available or (b) the user-selected tool is set to use the output of the user-selected tool and the output of the user-selected tool is not available.

In another variation of the embodiment, the output of the parent tool or the output of the user-selected tool is not available when the parent tool or the user-selected tool is running a job.

In yet another variation, the output of the parent tool or the output of the user-selected tool is not available when a job associated with the parent tool or the user-selected tool failed to run.

In still yet another variation, the method further comprises: determining that the output of the nearest ancestor tool is not available; and generating, in the image display, at least a portion of a display image in the ROI representative of: (v) the bank image when (a) the user-selected tool is set to use the output of the parent tool and the output of the parent tool and the output of the nearest ancestor tool are not available or (b) the user-selected tool is set to use the output of the user-selected tool and the output of the user-selected tool and the output of the nearest ancestor tool are not available.

In a further variation, the output of the nearest ancestor tool is not available when the nearest ancestor tool does not have an image output.

In another variation, the plurality of banks of imaging parameters include at least a light bank and a dark bank, the light bank having a higher brightness parameter than the dark bank.

In still yet another variation, the bank image is a first bank image of a plurality of bank images, each bank image of the plurality of bank images corresponding to a different bank of the plurality of banks, and the method further comprises: receiving each bank image of the plurality of bank images from the imaging device pursuant to each corresponding bank of the plurality of banks of imaging parameters.

In a further variation, the receiving each bank image of the plurality of bank images is responsive to an indication from the user.

In yet another variation, the bank image is a first bank image of a plurality of bank images, each bank image of the plurality of bank images corresponding to a different bank of the plurality of banks associated with a tool, and the method further comprises: receiving each bank image of the plurality of bank images from the imaging device pursuant to each corresponding bank of the plurality of banks of imaging parameters.

In still yet another variation, the method further comprises: determining that the fixed industrial scanner is not operating in a deploy mode; wherein the generating the at least a portion of the display image in the ROI is responsive to the determining.

In another variation, the user-selected tool is at least one of a brightness tool, a contrast tool, or a binarize tool.

In another embodiment, a fixed industrial scanner system is provided. The fixed industrial scanner system includes: one or more processors of a computing device executing an application, the application operable to analyze an image taken by a fixed industrial scanner system; and computer-readable media storing machine readable instructions that, when executed, cause the one or more processors to: (A) receive a bank image from the imaging device pursuant to one of a plurality of banks of imaging parameters, each of the plurality of banks of imaging parameters being different from each other of the plurality of banks of imaging parameters; (B) render the bank image in an image display; (C) receive an indication of a region of interest (ROI) in the image display associated with a user-selected tool, the ROI encapsulating a region of the image display; (D) determine whether the user-selected tool is set to use the bank image, an output of a parent tool, or an output of the user-selected tool; and (E) generate, in the image display, at least a portion of a display image in the ROI representative of: (i) the bank image when the user-selected tool is set to use the bank image, (ii) the output of the parent tool when the user-selected tool is set to use the output of the parent tool, or (iii) the output of the user-selected tool when the user-selected tool is set to use the output of the user-selected tool; wherein the portion of the display image is associated with the user-selected region.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
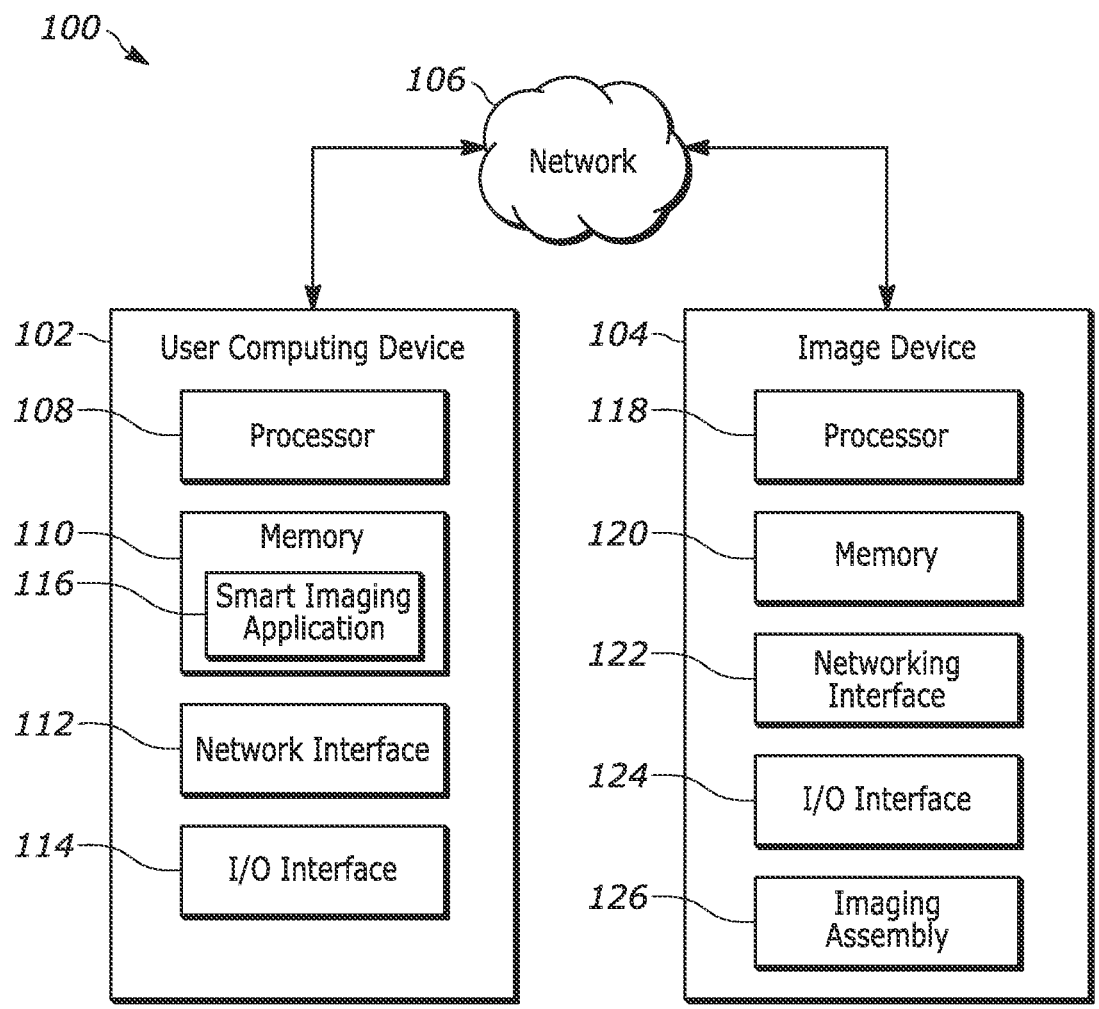
FIG. 1 is an example system for analyzing an image taken by a fixed industrial scanner system, in accordance with embodiments described herein.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

When imaging and/or analyzing images from an imaging system such as a fixed industrial scanner system, users utilize a variety of different tools, many of which operate best on different images, filters, etc. To maximize the utility of such tools for a user, the user may prefer to use different tools without needing to completely modify the image in question. However, operating a machine vision job using such tools causes confusion for a user when tools rely on images that the other tools are not using. For example, if a tool to highlight text in an image is operating on a bright image taken by the imaging system while the remainder of the tools are operating on a dark version of the image, a user may not be able to see the text in question. As such, the tool may display results incongruous with what the user actually sees. To address this, a user may generate different images until one displays an image congruous with what the tool outputs, or a user may attempt to modify and/or rerun the tool to fix the apparent disparity. As such, the apparent mismatch between visual output and tool output in a machine vision job may waste processing resources, time, and power. As used herein, a "machine vision job" or a "machine vision technique" can refer to any type of image analysis, including, e.g., reading barcodes, determining contrast, determining pixel counts, edge detection, etc.

By performing region of interest (ROI) image windowing as described herein, a user computing device and/or imaging system may more accurately provide visual indications to a user without requiring the additional processing power, resources, and time spent on individually generating and indicating views for each tool for each potential bank in a hierarchy. Similarly, rather than depicting only the background where the ROI is present and causing visual noise for a user to use computing resources parsing through and swapping between views, the user computing device and/or imaging system depicts the key information without further required input from the user.

More particularly, by implementing a ruleset as described herein to allow for ROI windowing, the user computing device and/or imaging system automatically determines and generates an ROI depicting the most pertinent information possible for a user. Because the user computing device and/or imaging system automatically determines the best view for the ROI, the user does not need to switch views or generate multiple views, saving processing power, time, and resources.

Figure 4:
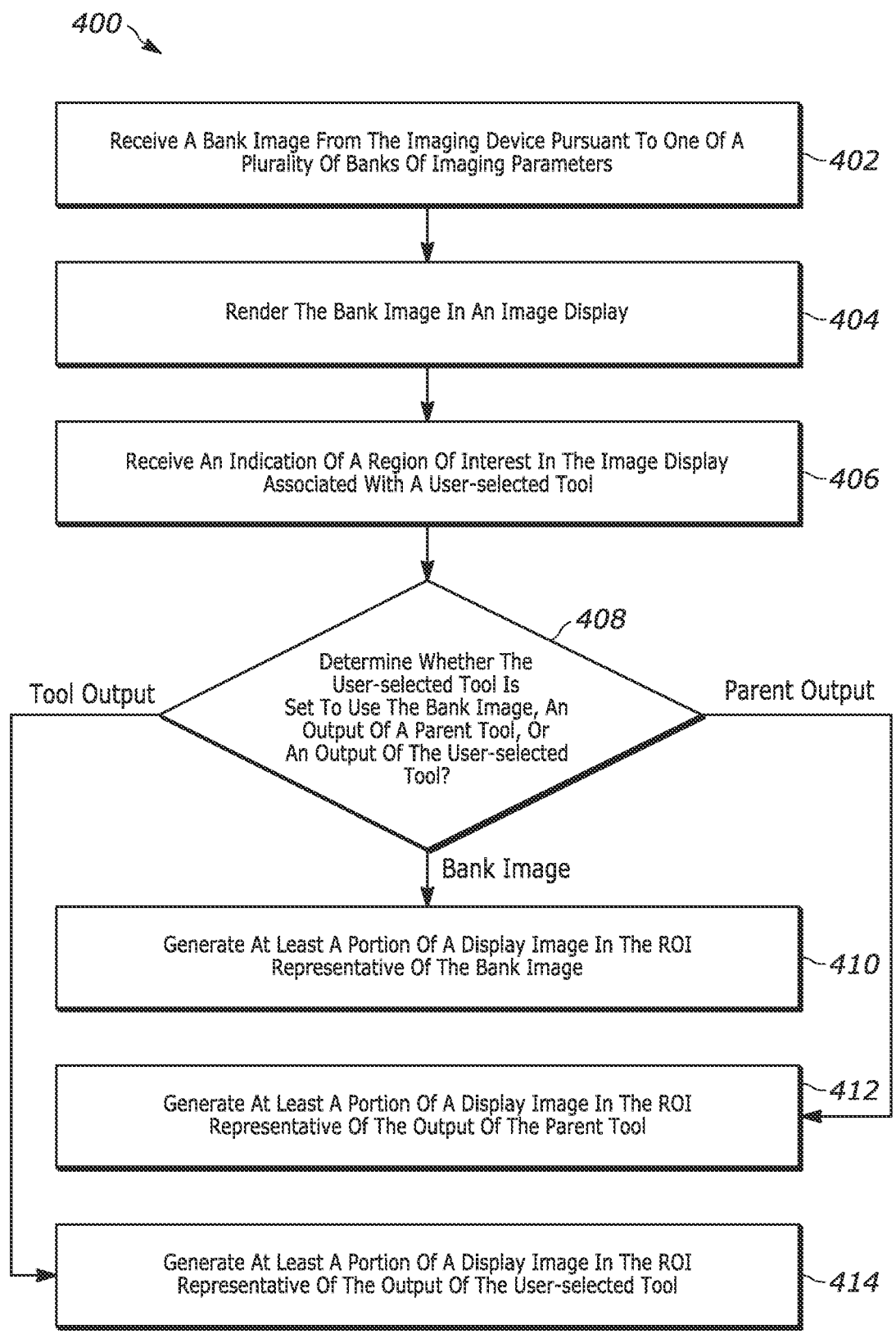
FIG. 4 illustrates a flow diagram of an example method for analyzing an image taken by a fixed industrial scanner system.
Figure 5:
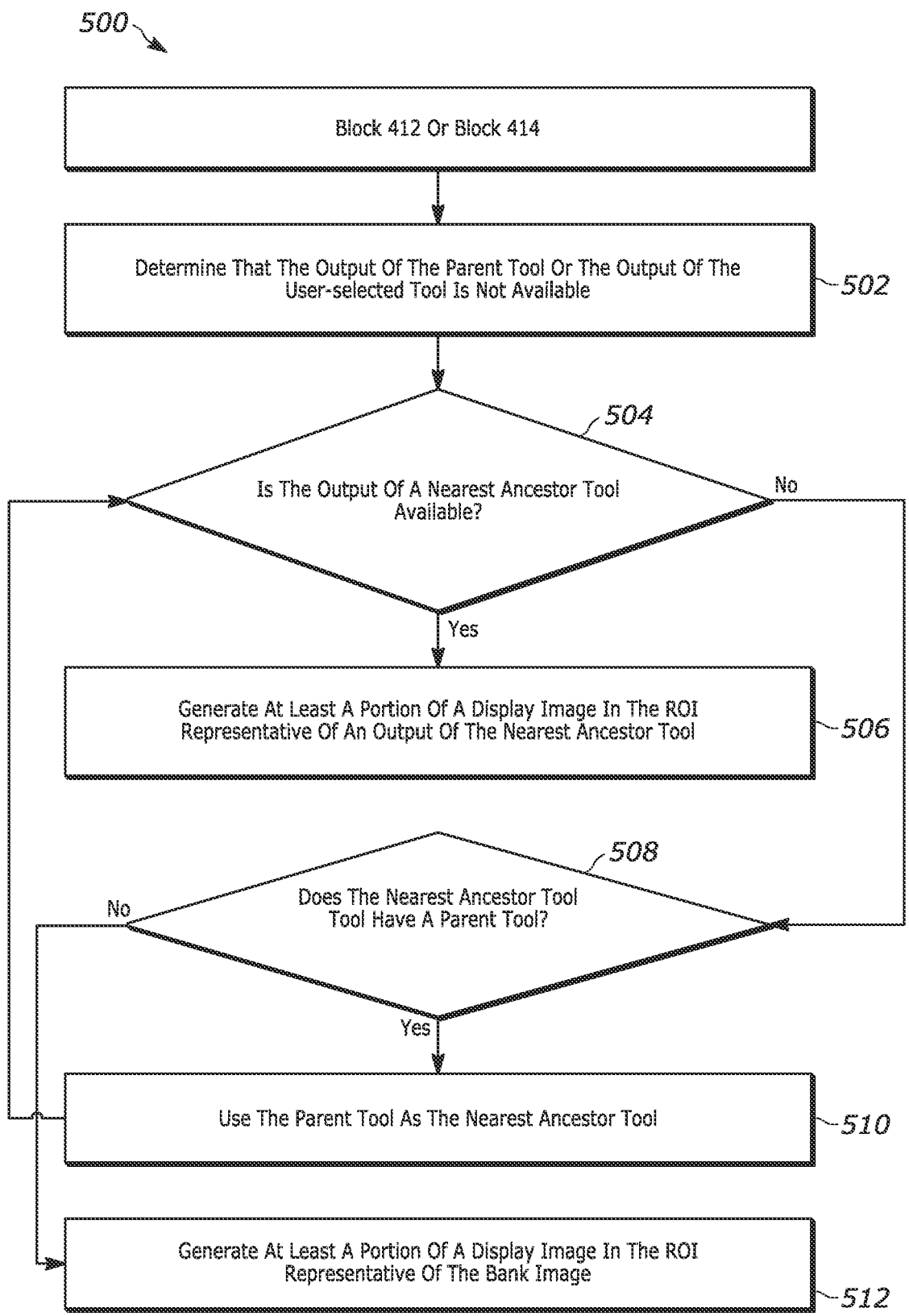
FIG. 5 illustrates a flow diagram of another example method for analyzing an image taken by a fixed industrial scanner system.

Referring now to FIG. 1, an example imaging system 100 configured to analyze an image of a target object is illustrated, in accordance with various embodiments disclosed herein. In the example embodiment of FIG. 1, the imaging system 100 includes a user computing device 102 and an imaging device 104 communicatively coupled to the user computing device 102 via a network 106. Generally speaking, the user computing device 102 and the imaging device 104 may be capable of executing instructions to, for example, implement operations of the example methods described herein, as may be represented by the flowcharts of the drawings that accompany this description, such as the method 400 as shown at FIG. 4 and/or the method 500 as shown at FIG. 5. The user computing device 102 is generally configured to enable a user/operator to create a machine vision job for execution on the imaging device 104 and/or subsequently edit or perform analysis on the results of the machine vision job in question. When created, the user/operator may then transmit/upload the machine vision job to the imaging device 104 via the network 106, where the machine vision job is then interpreted and executed. The user computing device 102 may comprise one or more operator workstations, and may include one or more processors 108, one or more memories 110, a networking interface 112, an input/output (I/O) interface 114, and/or a smart imaging application 116.

The user computing device 102 allows users to utilize various tools in performing analyses and/or modifications of images captured by the imaging device 104. In particular, the user computing device 102 displays images associated with an object and/or captured by the imaging device 104 according to a variety of parameters (e.g., bank images). In some implementations, bank images may include, be, or otherwise be part of the machine vision job images as described above with regard to FIG. 1.

A user may then select a tool, a bank image to display, parameters associated with the tool, etc., as illustrated with regard to FIGS. 3A-3D below. Then, depending on the tool, the user may indicate a region of interest (ROI) in the displayed image to indicate a "window" through which the user computing device 102 simulates modifications to the displayed image. For example, a user may, after the imaging device 104 executes a machine vision job and captures one or more bank images, select a bank image and a tool to use. The user may then, in a display, indicate an ROI (e.g., by clicking and dragging, placing an ROI and adjusting, accepting a default ROI, etc.) and generate a window for the ROI simulating an output for the tool.

Depending on the implementation, the tool may depend off of a bank image different than the one that the user computing device 102 displays, a parent tool, an output for the user tool, etc. As such, the user computing device 102 may determine what to use in displaying the contents of the ROI based on a series of rules, as described in detail with regard to FIGS. 4 and 5 below.

In some implementations, the rules may include rules such as the following: (i) for tools without image output or visual metadata, the ROI shows the underlying image on which the user computing device 102 runs the tool; (ii) for tools with an output set to another tool, the ROI shows the image output of the other tool; (iii) for tools with an output set to a bank image, the ROI shows the bank image; (iv) for filter tools or other tools with image output, the ROI shows the output image of the tool; (v) for an ROI at least partially outside the bounds of the parent too, the child ROI shows the underlying bank image of the parent tool or the nearest in-bounds ancestor tool output image in the non-overlapping area and the output of the parent tool in the overlapping area; (vi) if a tool or parent tool image result is not available, the ROI shows the nearest available ancestor tool output image; (vii) if a tool does not have an ancestor tool with available image out, the ROI shows the underlying bank image for the deepest ancestor.

In further implementations, the user computing device 102 transmits instructions to the imaging device 104 based on the ROI windows generated according to user input. As such, in some implementations, the imaging device 104 generates the ROI windows and/or contents of the ROI windows in addition to or in place of the user computing device 102.

The imaging device 104 is connected to the user computing device 102 via a network 106, and is configured to interpret and execute machine vision jobs received from the user computing device 102. Generally, the imaging device 104 may obtain a job file containing one or more job scripts from the user computing device 102 across the network 106 that may define the machine vision job and may configure the imaging device 104 to capture and/or analyze images in accordance with the machine vision job. In further implementations, the job script(s) for the job file may define the machine vision job such that the imaging device 104 captures the images including and/or according to ROI window contents as described above. As such, the imaging device 104 may, in some implementations, automatically transmit data related to the machine vision job to the user computing device 102. In further implementations, the imaging device 104 may temporarily store the results of a machine vision job (e.g., bank images, ROI windowing data, etc.) and may transmit the results to the user computing device 102 in response to a request from the user computing device 102.

As an example, the imaging device 104 may include flash memory used for determining, storing, or otherwise processing imaging data/datasets and/or post-imaging data. The imaging device 104 may then receive, recognize, and/or otherwise interpret a trigger that causes the imaging device 104 to capture an image of the target object in accordance with the configuration established via the one or more job scripts as described herein. Once captured and/or analyzed, the imaging device 104 may transmit the images and any associated data across the network 106 to the user computing device 102 for further analysis and/or storage. In various embodiments, the imaging device 104 may be a "smart" camera and/or may otherwise be configured to automatically perform sufficient functionality of the imaging device 104 in order to obtain, interpret, and execute job scripts that define machine vision jobs, such as any one or more job scripts contained in one or more job files as obtained, for example, from the user computing device 102.

Broadly, the job file may be a JSON representation/data format of the one or more job scripts transferrable from the user computing device 102 to the imaging device 104. The job file may further be loadable/readable by a C++ runtime engine, or other suitable runtime engine, executing on the imaging device 104. Moreover, the imaging device 104 may run a server (not shown) configured to listen for and/or receive job files across the network 106 from the user computing device 102. Additionally or alternatively, the server configured to listen for and/or receive job files may be implemented as one or more cloud-based servers, such as a cloud-based computing platform. For example, the server may be any one or more cloud-based platform(s) such as MICROSOFT AZURE, AMAZON AWS, or the like.

In any event, the imaging device 104 may include one or more processors 118, one or more memories 120, a networking interface 122, an I/O interface 124, and an imaging assembly 126. The imaging assembly 126 may include a digital camera and/or digital video camera for capturing or taking digital images and/or frames. Each digital image may comprise pixel data that may be analyzed by one or more tools each configured to perform an image analysis task as described above. The digital camera and/or digital video camera of, e.g., the imaging assembly 126 may be configured, as disclosed herein, to take, capture, or otherwise generate digital images and, at least in some embodiments, may store such images in a memory (e.g., one or more memories 110, 120) of a respective device (e.g., user computing device 102, imaging device 104).

For example, the imaging assembly 126 may include a photo-realistic camera (not shown) for capturing, sensing, or scanning 2D image data. The photo-realistic camera may be an RGB (red, green, blue) based camera for capturing 2D images having RGB-based pixel data. In various embodiments, the imaging assembly may additionally include a three-dimensional (3D) camera (not shown) for capturing, sensing, or scanning 3D image data. The 3D camera may include an Infra-Red (IR) projector and a related IR camera for capturing, sensing, or scanning 3D image data/datasets. In some embodiments, the photo-realistic camera of the imaging assembly 126 may capture 2D images, and related 2D image data, at the same or similar point in time as the 3D camera of the imaging assembly 126 such that the imaging device 104 can have both sets of 3D image data and 2D image data available for a particular surface, object, area, or scene at the same or similar instance in time. In various embodiments, the imaging assembly 126 may include the 3D camera and the photo-realistic camera as a single imaging apparatus configured to capture 3D depth image data simultaneously with 2D image data. Consequently, the captured 2D images and the corresponding 2D image data may be depth-aligned with the 3D images and 3D image data.

In embodiments, imaging assembly 126 may be configured to capture images of surfaces or areas of a predefined search space or target objects within the predefined search space. For example, each tool included in a job script may additionally include a capture ROI corresponding to a specific region or a target object imaged by the imaging assembly 126. The composite area defined by the capture ROIs for all tools included in a particular job script may thereby define the predefined search space which the imaging assembly 126 may capture in order to facilitate the execution of the job script. However, the predefined search space may be user-specified to include a field of view (FOV) featuring more or less than the composite area defined by the capture ROIs of all tools included in the particular job script. Depending on the implementation, the composite area defined by the capture ROIs may include, exclude, partially include, partially exclude, etc. the user-defined ROIs associated with tools as described with regard to the user computing device 102. It should be noted that the imaging assembly 126 may capture 2D and/or 3D image data/datasets of a variety of areas, such that additional areas in addition to the predefined search spaces are contemplated herein. Moreover, in various embodiments, the imaging assembly 126 may be configured to capture other sets of image data in addition to the 2D/3D image data, such as grayscale image data or amplitude image data, each of which may be depth-aligned with the 2D/3D image data.

The imaging device 104 may also process the 2D image data/datasets and/or 3D image datasets for use by other devices (e.g., the user computing device 102, an external server). For example, the one or more processors 118 may process the image data or datasets captured, scanned, or sensed by the imaging assembly 126. The processing of the image data may generate post-imaging data that may include metadata, simplified data, normalized data, result data, status data, or alert data as determined from the original scanned or sensed image data. Depending on the implementation, the processing of the image data may further generate ROI window data, metadata associated with an ROI, etc. as described above with regard to the user computing device 102. The image data and/or the post-imaging data may be sent to the user computing device 102 executing the smart imaging application 116 for viewing, manipulation, and/or otherwise interaction. In other embodiments, the image data and/or the post-imaging data may be sent to a server for storage or for further manipulation. As described herein, the user computing device 102, imaging device 104, and/or external server or other centralized processing unit and/or storage may store such data, and may also send the image data and/or the post-imaging data to another application implemented on a user device, such as a mobile device, a tablet, a handheld device, or a desktop device.

Each of the one or more memories 110, 120 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others. In general, a computer program or computer based product, application, or code (e.g., smart imaging application 116, or other computing instructions described herein) may be stored on a computer usable storage medium, or tangible, non-transitory computer-readable medium (e.g., standard random access memory (RAM), an optical disc, a universal serial bus (USB) drive, or the like) having such computer-readable program code or computer instructions embodied therein, wherein the computer-readable program code or computer instructions may be installed on or otherwise adapted to be executed by the one or more processors 108, 118 (e.g., working in connection with the respective operating system in the one or more memories 110, 120) to facilitate, implement, or perform the machine readable instructions, methods, processes, elements or limitations, as illustrated, depicted, or described for the various flowcharts, illustrations, diagrams, figures, and/or other disclosure herein. In this regard, the program code may be implemented in any desired program language, and may be implemented as machine code, assembly code, byte code, interpretable source code or the like (e.g., via Golang, Python, C, C++, C#, Objective-C, Java, Scala, ActionScript, JavaScript, HTML, CSS, XML, etc.).

The one or more memories 110, 120 may store an operating system (OS) (e.g., Microsoft Windows, Linux, UNIX, etc.) capable of facilitating the functionalities, apps, methods, or other software as discussed herein. The one or more memories 110 may also store the smart imaging application 116, which may be configured to enable machine vision job construction, as described further herein. Additionally, or alternatively, the smart imaging application 116 may also be stored in the one or more memories 120 of the imaging device 104, and/or in an external database (not shown), which is accessible or otherwise communicatively coupled to the user computing device 102 via the network 106. The one or more memories 110, 120 may also store machine readable instructions, including any of one or more application(s), one or more software component(s), and/or one or more application programming interfaces (APIs), which may be implemented to facilitate or perform the features, functions, or other disclosure described herein, such as any methods, processes, elements or limitations, as illustrated, depicted, or described for the various flowcharts, illustrations, diagrams, figures, and/or other disclosure herein. For example, at least some of the applications, software components, or APIs may be, include, or otherwise be part of a machine vision based imaging application, such as the smart imaging application 116, where each may be configured to facilitate their various functionalities discussed herein. It should be appreciated that one or more other applications may be envisioned and that are executed by the one or more processors 108, 118.

The one or more processors 108, 118 may be connected to the one or more memories 110, 120 via a computer bus responsible for transmitting electronic data, data packets, or otherwise electronic signals to and from the one or more processors 108, 118 and one or more memories 110, 120 in order to implement or perform the machine readable instructions, methods, processes, elements or limitations, as illustrated, depicted, or described for the various flowcharts, illustrations, diagrams, figures, and/or other disclosure herein, e.g., such as the method 400 as shown at FIG. 4 and/or the method 500 as shown at FIG. 5.

The one or more processors 108, 118 may interface with the one or more memories 110, 120 via the computer bus to execute the operating system (OS). The one or more processors 108, 118 may also interface with the one or more memories 110, 120 via the computer bus to create, read, update, delete, or otherwise access or interact with the data stored in the one or more memories 110, 120 and/or external databases (e.g., a relational database, such as Oracle, DB2, MySQL, or a NoSQL based database, such as MongoDB). The data stored in the one or more memories 110, 120 and/or an external database may include all or part of any of the data or information described herein, including, for example, machine vision job images (e.g., images captured by the imaging device 104 in response to execution of a job script) and/or other suitable information.

The networking interfaces 112, 122 may be configured to communicate (e.g., send and receive) data via one or more external/network port(s) to one or more networks or local terminals, such as network 106, described herein. In some embodiments, networking interfaces 112, 122 may include a client-server platform technology such as ASP.NET, Java J2EE, Ruby on Rails, Node.js, a web service or online API, responsive for receiving and responding to electronic requests. The networking interfaces 112, 122 may implement the client-server platform technology that may interact, via the computer bus, with the one or more memories 110, 120 (including the applications(s), component(s), API(s), data, etc. stored therein) to implement or perform the machine readable instructions, methods, processes, elements or limitations, as illustrated, depicted, or described for the various flowcharts, illustrations, diagrams, figures, and/or other disclosure herein.

According to some embodiments, the networking interfaces 112, 122 may include, or interact with, one or more transceivers (e.g., WWAN, WLAN, and/or WPAN transceivers) functioning in accordance with IEEE standards, 3GPP standards, or other standards, and that may be used in receipt and transmission of data via external/network ports connected to network 106. In some embodiments, network 106 may comprise a private network or local area network (LAN). Additionally or alternatively, network 106 may comprise a public network such as the Internet. In some embodiments, the network 106 may comprise routers, wireless switches, or other such wireless connection points communicating to the user computing device 102 (via the networking interface 112) and the imaging device 104 (via networking interface 122) via wireless communications based on any one or more of various wireless standards, including by non-limiting example, IEEE 802.11a/b/c/g (WIFI), the BLUETOOTH standard, or the like.

The I/O interfaces 114, 124 may include or implement operator interfaces configured to present information to an administrator or operator and/or receive inputs from the administrator or operator. An operator interface may provide a display screen (e.g., via the user computing device 102 and/or imaging device 104) which a user/operator may use to visualize any images, graphics, text, data, features, pixels, and/or other suitable visualizations or information. For example, the user computing device 102 and/or imaging device 104 may comprise, implement, have access to, render, or otherwise expose, at least in part, a graphical user interface (GUI) for displaying images, graphics, text, data, features, pixels, and/or other suitable visualizations or information on the display screen. The I/O interfaces 114, 124 may also include I/O components (e.g., ports, capacitive or resistive touch sensitive input panels, keys, buttons, lights, LEDs, any number of keyboards, mice, USB drives, optical drives, screens, touchscreens, etc.), which may be directly/indirectly accessible via or attached to the user computing device 102 and/or the imaging device 104. According to some embodiments, an administrator or user/operator may access the user computing device 102 and/or imaging device 104 to construct jobs, review images or other information, make changes, input responses and/or selections, and/or perform other functions, as described above.

As described above, in some embodiments, the user computing device 102 may perform the functionalities as discussed herein as part of a "cloud" network or may otherwise communicate with other hardware or software components within the cloud to send, retrieve, or otherwise analyze data or information described herein.

Figure 2:
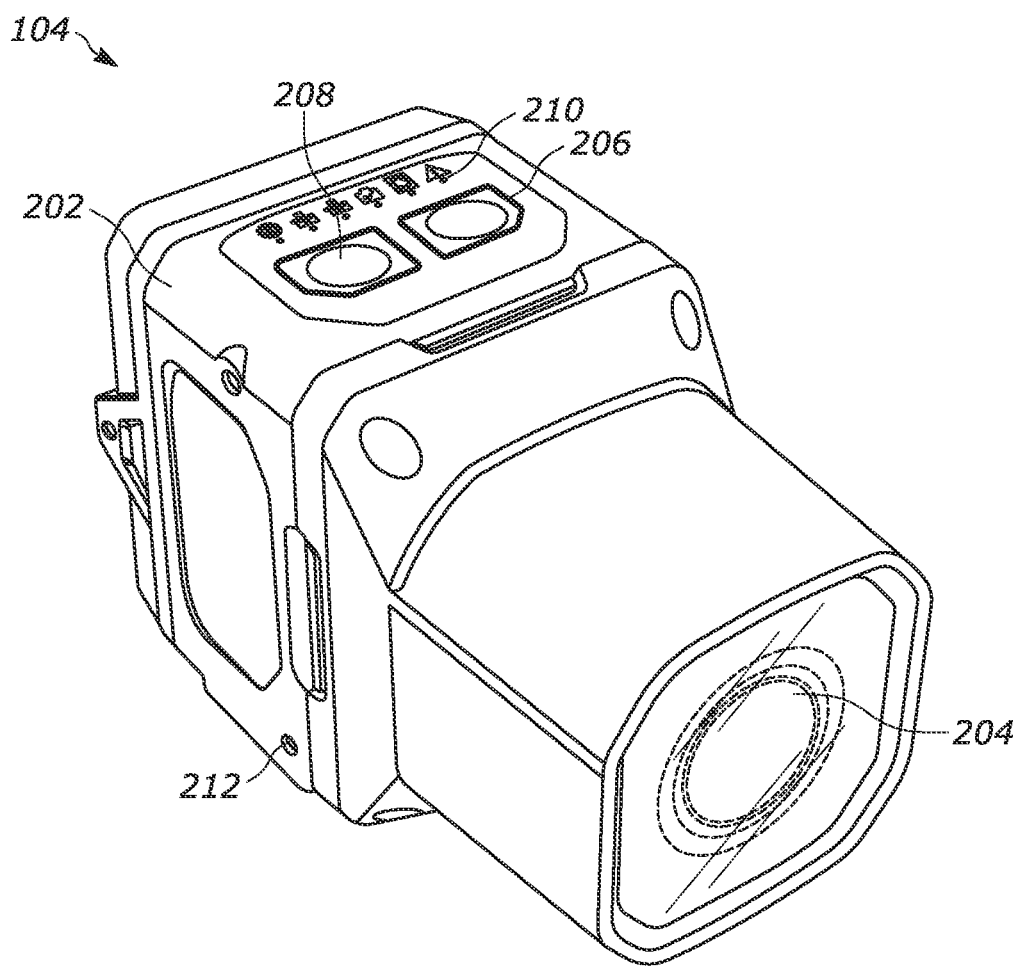
FIG. 2 is a perspective view of the imaging device of FIG. 1, in accordance with embodiments described herein.

FIG. 2 is a perspective view of the imaging device 104 of FIG. 1, in accordance with embodiments described herein. The imaging device 104 may include a housing 202, an imaging aperture 204, a user interface label 206, a dome switch/button 208, one or more light emitting diodes (LEDs) 210, and/or mounting point(s) 212. As previously mentioned, the imaging device 104 may obtain job files from a user computing device (e.g., user computing device 102) which the imaging device 104 thereafter interprets and executes. The instructions included in the job file may include device configuration settings (also referenced herein as "imaging settings") operable to adjust the configuration of the imaging device 104 prior to capturing images of a target object.

For example, the device configuration settings may include instructions to adjust one or more settings related to the imaging aperture 204. As an example, assume that at least a portion of the intended analysis corresponding to a machine vision job requires the imaging device 104 to maximize the brightness of any captured image. To accommodate this requirement, the job file may include device configuration settings to increase the aperture size of the imaging aperture 204. The imaging device 104 may interpret these instructions (e.g., via one or more processors 118) and accordingly increase the aperture size of the imaging aperture 204. Thus, the imaging device 104 may be configured to automatically adjust its own configuration to optimally conform to a particular machine vision job. Additionally, the imaging device 104 may include or otherwise be adaptable to include, for example but without limitation, one or more bandpass filters, one or more polarizers, one or more DPM diffusers, one or more C-mount lenses, and/or one or more C-mount liquid lenses over or otherwise influencing the received illumination through the imaging aperture 204.

In further implementations, the imaging device 104 interprets the instructions (e.g., via the one or more processors 118) to analyze and/or edit the image in accordance with the rules as described above with regard to FIG. 1. For example, the imaging device 104 may capture a number of bank images representative of a number of banks with which tools indicated by the user are associated. Similarly, the imaging device 104 may capture at least part of the images multiple times in accordance with multiple setting (e.g., at a higher brightness, with a filter, etc.) in accordance with the user-indicated ROIs as described above with regard to FIG. 1.

The user interface label 206 may include the dome switch/button 208 and one or more LEDs 210, and may thereby enable a variety of interactive and/or indicative features. Generally, the user interface label 206 may enable a user to trigger and/or tune to the imaging device 104 (e.g., via the dome switch/button 208) and to recognize when one or more functions, errors, and/or other actions have been performed or taken place with respect to the imaging device 104 (e.g., via the one or more LEDs 210). For example, the trigger function of a dome switch/button (e.g., dome/switch button 208) may enable a user to capture an image using the imaging device 104 and/or to display a trigger configuration screen of a user application (e.g., smart imaging application 116). The trigger configuration screen may allow the user to configure one or more triggers for the imaging device 104 that may be stored in memory (e.g., one or more memories 110, 120) for use in later developed machine vision jobs, as discussed herein.

As another example, the tuning function of a dome switch/button (e.g., dome/switch button 208) may enable a user to automatically and/or manually adjust the configuration of the imaging device 104 in accordance with a preferred/predetermined configuration and/or to display an imaging configuration screen of a user application (e.g., smart imaging application 116). The imaging configuration screen may allow the user to configure one or more configurations of the imaging device 104 (e.g., aperture size, exposure length, etc.) that may be stored in memory (e.g., one or more memories 110, 120) for use in later developed machine vision jobs, as discussed herein.

To further this example, and as discussed further herein, a user may utilize the imaging configuration screen (or more generally, the smart imaging application 116) to establish two or more configurations of imaging settings for the imaging device 104. The user may then save these two or more configurations of imaging settings as part of a machine vision job that is then transmitted to the imaging device 104 in a job file containing one or more job scripts. The one or more job scripts may then instruct the imaging device 104 processors (e.g., one or more processors 118) to automatically and sequentially adjust the imaging settings of the imaging device in accordance with one or more of the two or more configurations of imaging settings after each successive image capture.

The mounting point(s) 212 may enable a user connecting and/or removably affixing the imaging device 104 to a mounting device (e.g., imaging tripod, camera mount, etc.), a structural surface (e.g., a warehouse wall, a warehouse ceiling, structural support beam, etc.), other accessory items, and/or any other suitable connecting devices, structures, or surfaces. For example, the imaging device 104 may be optimally placed on a mounting device in a distribution center, manufacturing plant, warehouse, and/or other facility to image and thereby monitor the quality/consistency of products, packages, and/or other items as they pass through the imaging device's 104 FOV. Moreover, the mounting point(s) 212 may enable a user to connect the imaging device 104 to a myriad of accessory items including, but without limitation, one or more external illumination devices, one or more mounting devices/brackets, and the like.

In addition, the imaging device 104 may include several hardware components contained within the housing 202 that enable connectivity to a computer network (e.g., network 106). For example, the imaging device 104 may include a networking interface (e.g., networking interface 122) that enables the imaging device 104 to connect to a network, such as a Gigabit Ethernet connection and/or a Dual Gigabit Ethernet connection. Further, the imaging device 104 may include transceivers and/or other communication components as part of the networking interface to communicate with other devices (e.g., the user computing device 102) via, for example, Ethernet/IP, PROFINET, Modbus TCP, CC-Link, USB 3.0, RS-232, and/or any other suitable communication protocol or combinations thereof.

FIGS. 3A-3D depict example application interfaces 300A-300D utilized to perform one or more jobs in accordance with embodiments described herein. Generally, the example application interface 300 may represent an interface of a smart imaging application (e.g., smart imaging application 116) a user may access via a user computing device (e.g., user computing device 102). Specifically, the example application interfaces 300A-300D may present a user with a series of menus to create a job, edit a job, edit an image, generate ROIs, and/or otherwise perform user-defined tasks. In performing such a task, the user is able to select from a variety of tools which form a particular job. Such tools may include, but are not limited to, (i) a barcode scanning/reading tool, (ii) a pattern matching tool, (iii) an edge tool (e.g., edge detection, edge count, edge measurement, etc.), (iv) a semantic segmentation tool, (v) an object detection tool, (vi) an object tracking tool, (vii) a pixel count tool, (viii) a blob tool (e.g., a tool that finds an enclosed region different from surroundings to detect characters, images, etc.), (viii) a brightness tool, (ix) a contrast tool, (x) a binarize tool (e.g., a tool that brightens light spots, such as white areas, in an image and darkens dark spots, such as black areas, in an image), etc.

Depending on the implementation, when configuring a job, and more specifically, the parameters of a tool, the example application interfaces 300A-D may be configured to provide options for selecting a plurality of banks for this tool. As used herein, a bank refers to a set of imaging parameters that are associated with imaging device 104. Such imaging parameters include, but are not limited to, gain, exposure, focal distance, f number, illumination intensity, illumination color, illumination source, digital filter, etc. In some implementations, once a tool has been configured with a specific bank, upon the execution of that tool the imaging device 104 will operate pursuant to the parameters set forth in the specific bank.

In FIGS. 3A-3D, each example application interface 300A-D depicts an example display image including one or more ROI windows. In the exemplary embodiment of FIG. 3A, example application interface 300A depicts a rendered display image 302A based on a dark bank image as well as two ROIs for two different tools. The brightness tool depends off of a bright bank and the ROI 304A associated with the brightness tool depicts the output of the brightness tool, brightening the bright bank image. The contrast tool depends off of the dark bank and the ROI 306A associated with the contrast tool depicts the dark bank image. As such, a user can visualize the relevant imagery even when an ROI is inside of a different bank image and/or ROI depending from another bank image or tool.

Figure 3A:
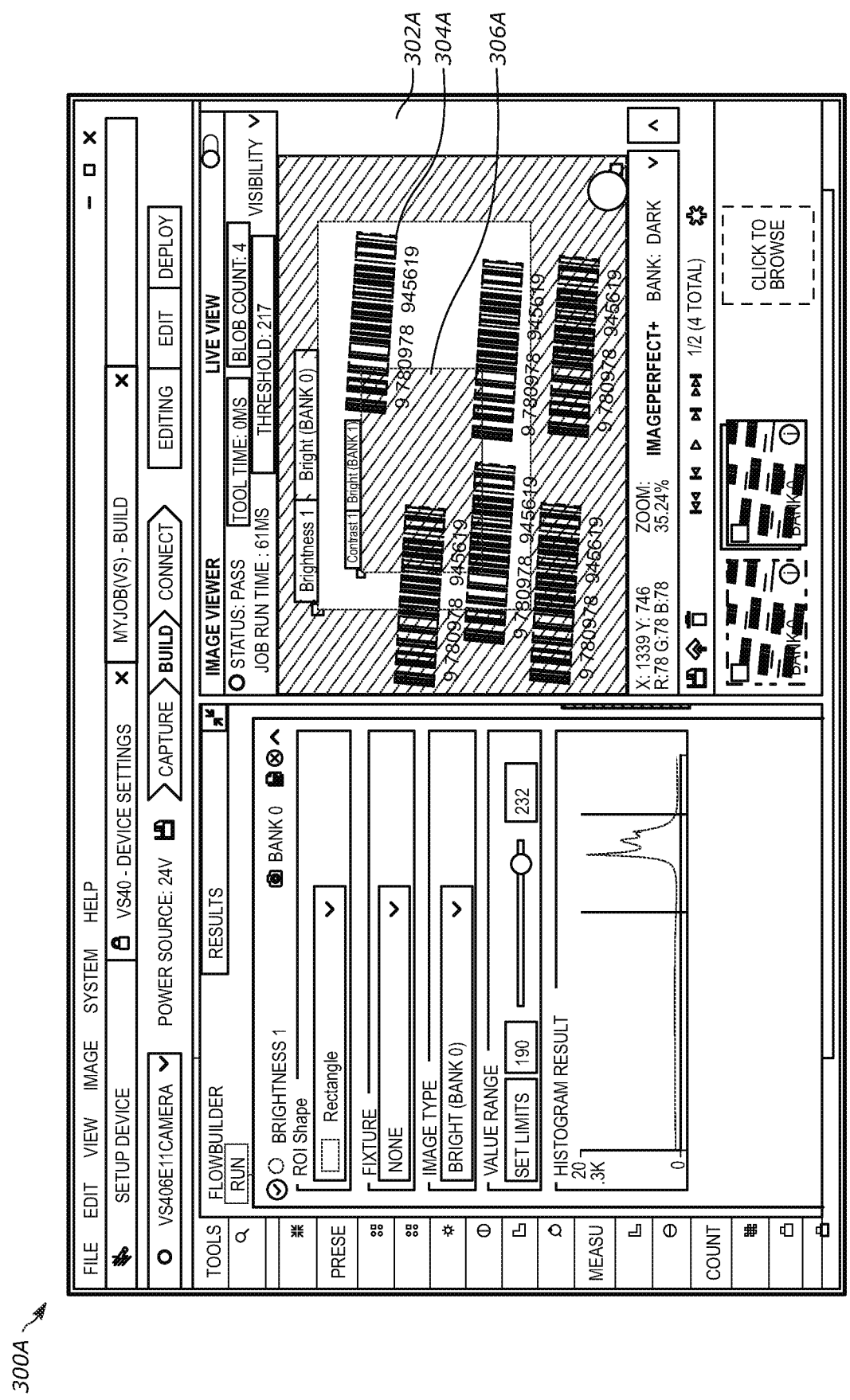
FIG. 3A depicts an example application interface displaying various ROI windows associated with image banks, in accordance with embodiments described herein.
Figure 3B:
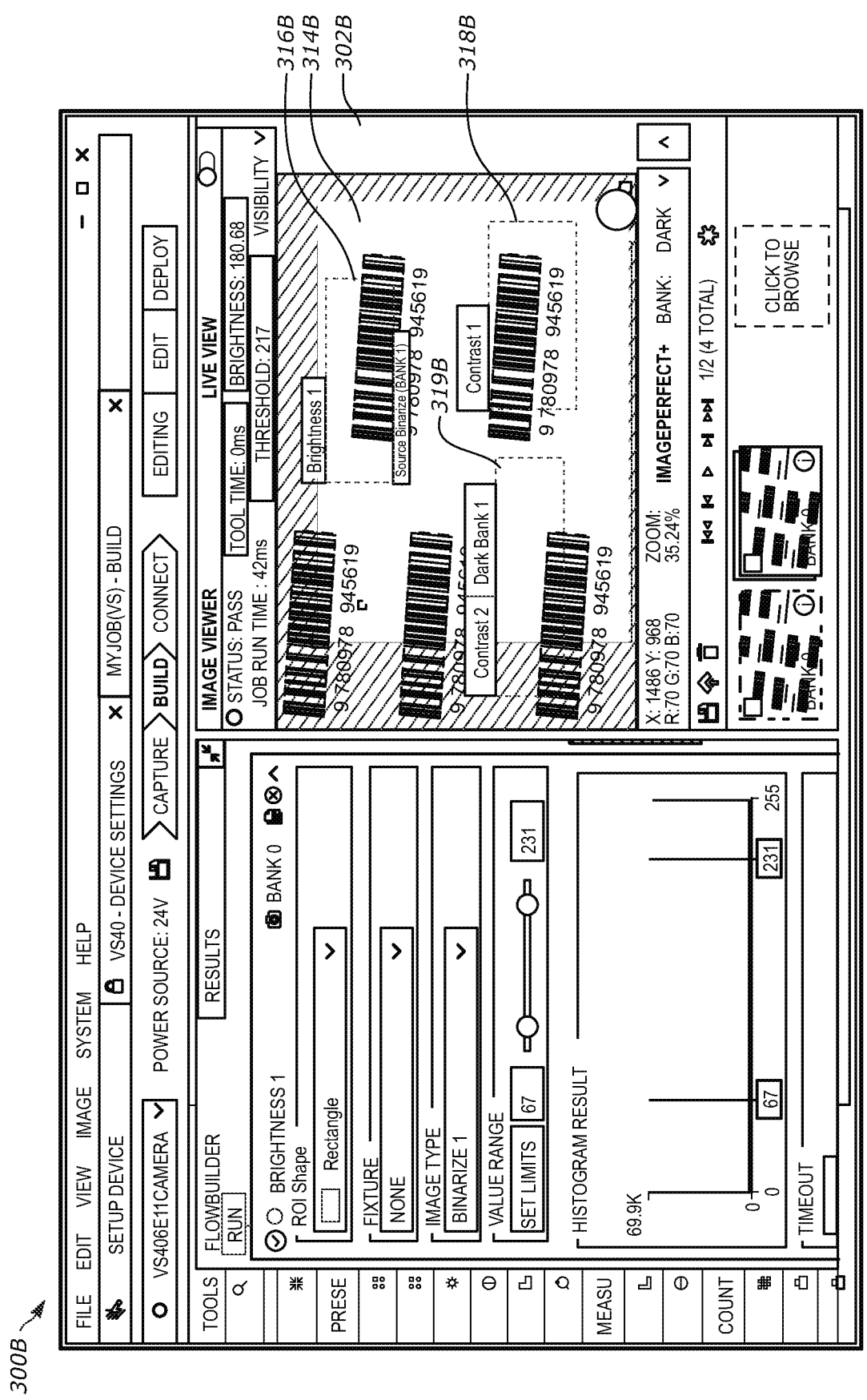
FIG. 3B depicts an example application interface displaying various ROI windows associated with image banks or tool outputs, in accordance with embodiments described herein.

Similarly, in the exemplary embodiment of FIG. 3B, example application interface 300B depicts a rendered display image 302B based on a dark bank image as well as four ROIs for four tools. The binarize tool depends off of the dark bank image and the ROI 314B associated with the binarize tool depicts the visual output of the binarize tool based on the dark bank image. The brightness tool depends from the binarize tool and the ROI 316B associated with the brightness tool depicts the output of the binarize tool. The first and second contrast tools depend off of the bright bank and the dark bank, respectively, and the ROI 318B and 319B associated with each depicts the bank image in question, not the output of the binarize tool.

Figure 3C:
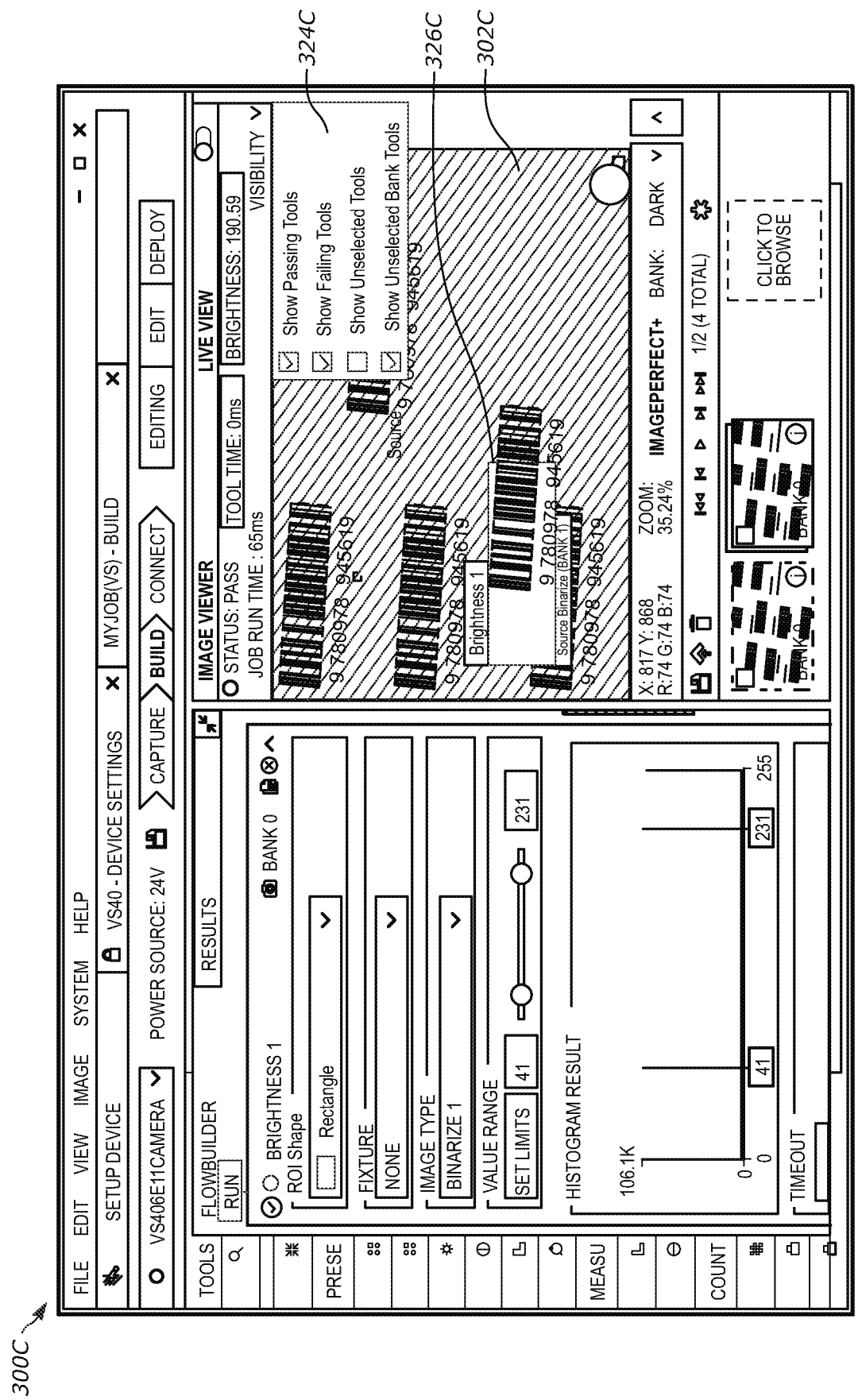
FIG. 3C depicts an example application interface displaying an ROI window associated with a single tool and the view of an associated image bank, in accordance with embodiments described herein.

In the exemplary embodiment of FIG. 3C, example application interface 300C depicts a rendered display image 302C based on a dark bank image as well as a single ROI 326C associated with a brightness tool. The brightness tool depends off of a binarize tool that is not depicted (due to the selection of an option 324C to hide other tools from the display image), but the ROI 326C associated with the brightness tool still depicts the output of the binarize tool in question.

Figure 3D:
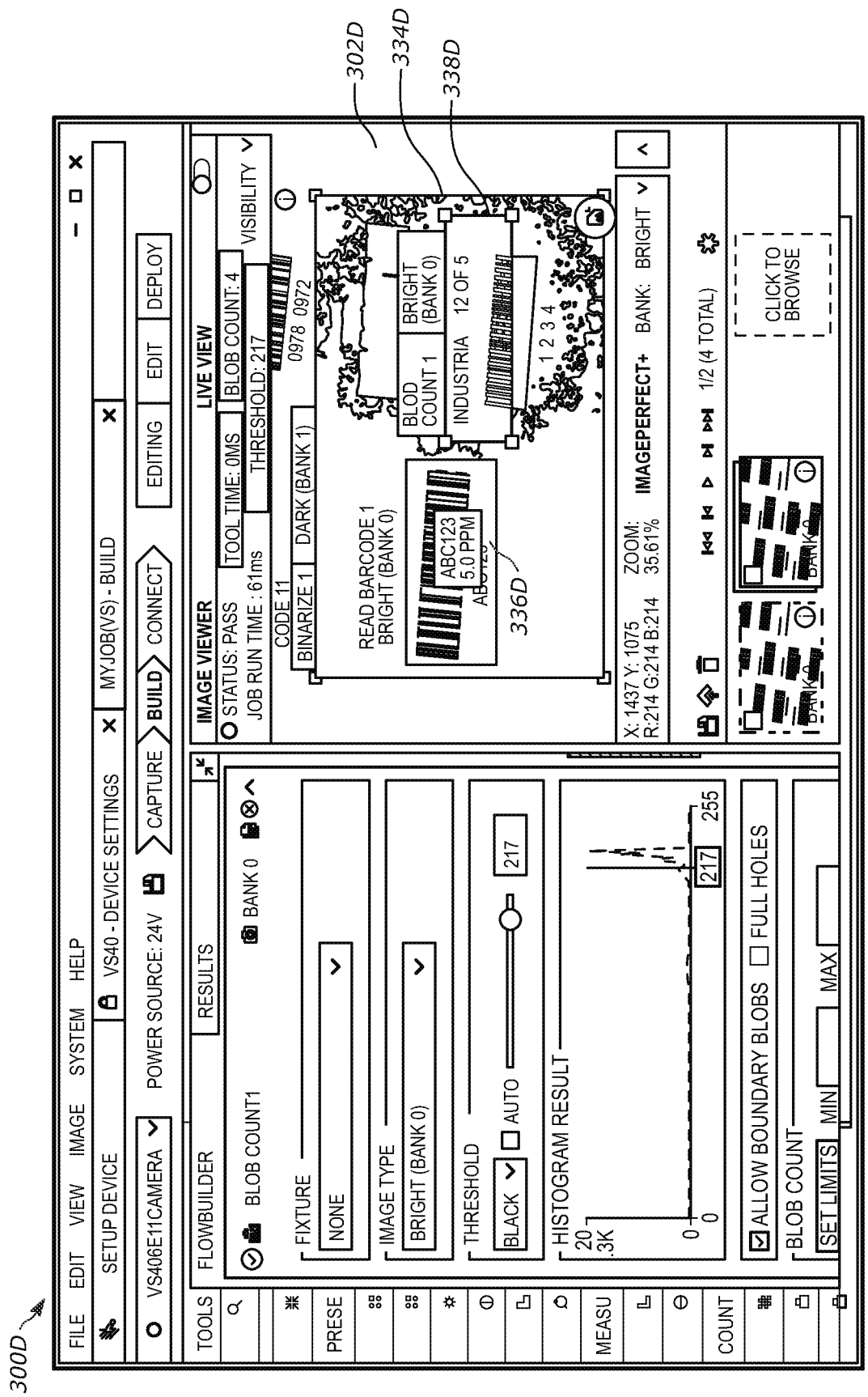
FIG. 3D depicts an example application interface displaying contrast between various ROI windows associated with image banks, in accordance with embodiments described herein.

In the exemplary embodiment of FIG. 3D, example application interface 300D depicts a rendered display image 302D based on a bright bank image as well as three ROIs for three different tools. The binarize tool depends off of a darkness bank image that is not depicted (due to the use of the bright bank image to generate the display image), and the ROI 334D associated with the binarize tool depicts the output of the binarize tool based on the dark bank. Each of the read barcode tool and the blob tool depend from the bright bank, however, and the ROI 335D and 338D associated with teach depicts the bright bank with metadata based on the tool in question. For example, the blob count tool ROI 338D depicts highlighted characteristics that would not be visible in the binarize tool, and the read barcode tool ROI 336D depicts an outline of the barcode that would similarly not be visible in the binarize tool. As such, by using an ROI window technique, each tool ROI visually displays pertinent information to a user without causing undue confusion by displaying visual metadata without the image itself.

Depending on the implementation, each bank used by one of the example application interfaces 300A-D may be pre-configured at a different stage of configuration of the job and/or may be a separate function not associated with any particular job at all. In other words, a user may have an option to create and/or edit any number of banks within some portion of the example application interfaces 300A-D such that each of the banks will be available for selection at a later time when a job is being created or edited. In some embodiments, a creation and/or editing of banks may be done as part of creating/editing a particular job. Also, in some embodiments, various menus (not shown) may provide an option to create or edit a bank from within the menu. Depending on the implementation, the banks may include bright banks, dark banks, colored light banks, a default bank, etc.

By performing ROI image windowing as described herein, the user computing device 102 and/or imaging device 104 may more accurately provide visual indications to a user without requiring additional processing power, resources, and time spent on individually generating and indicating views for each tool for each potential bank in a hierarchy. For example, rather than generating display images for a tool for each bank, each parent tool, each ancestor tool, etc., the user computing device 102 and/or imaging device 104 may instead generate a single image depicting key information for a user to view. Similarly, rather than depicting only the background where the ROI is present and causing visual noise for a user to use computing resources parsing through and swapping between views, the user computing device 102 and/or imaging device 104 depicts the key information without further required input from the user.

More particularly, by implementing a ruleset as described herein to allow for ROI windowing, the user computing device 102 and/or imaging device 104 automatically determines and generates an ROI depicting the most pertinent information possible for a user. Because the user computing device 102 and/or imaging device 104 automatically determines the best view for the ROI, the user does not need to switch views or generate multiple views, saving processing power, time, and resources. Further, the instant techniques address problems inherent in displaying relevant information to a user in a condensed space, such as the example application interfaces 300A-D.

Referring next to FIG. 4 the method 400 illustrates a flow diagram of an example method for analyzing an image using ROI windows that display important information to a user. Although the method 400 is described below with regard to user computing device 102 and components thereof as illustrated in FIG. 1, it will be understood that other similarly suitable imaging devices and components may be used instead.

At block 402, the user computing device 102 receives a bank image from the imaging device pursuant to one of a plurality of banks of imaging parameters. As used herein, a bank refers to a set of imaging parameters that are associated with imaging device 104. Such imaging parameters include, but are not limited to, gain, exposure, focal distance, f number, illumination intensity, illumination color, illumination source, digital filter, etc. Typically, once a tool has been configured with a specific bank, upon the execution of that tool the imaging device 104 will operate pursuant to the parameters set forth in the specific bank. Similarly, as used herein, a bank image refers to an image captured according to a corresponding set of imaging parameters for the bank in question. Depending on the implementation, the bank image may be based on and/or differentiated from other bank images according to the brightness of the bank image. In some such implementations, the bank images may include a dark bank image, a bright bank image, etc.

In some implementations, the user computing device 102 receives multiple bank images corresponding to different banks from the imaging device 104 pursuant to each corresponding bank of imaging parameters. Depending on the implementation, the user computing device 102 may receive each bank image in response to receiving an indication from the user. In some such implementations, the user computing device 102 receives multiple bank images in response to a single indication, a different bank image in response to a different indication, an indication including which bank images to receive, etc. In further implementations, the user computing device 102 receives multiple bank images where each bank image is associated with a tool (e.g., if 3 tools only have 2 different banks shared between the tools, then only capturing the 2 bank images). In some implementations, the user may select or deselect an option (e.g., a "Show Image" box) to only capture a single bank image and/or to capture bank images without rendering the image until the user reselects or deselects the option.

At block 404, the user computing device 102 renders the bank image in an image display. Depending on the implementation, the user computing device 102 may receive multiple bank images representative of different views, angles, components, bank imaging parameters, etc. In some such implementations, the user may select a bank image to render via a drop down menu, button, checkbox, etc. by interacting with the user computing device 102. In further implementations, the user may select a bank image to generally render, a bank image to associate with an instance of an individual tool and to render when the tool is selected, a bank image to generally associate with tools used for the current job and to render when the current job is selected, etc.

At block 406, the user computing device 102 receives an indication of a region of interest (ROI) in the image display associated with a user-selected tool. Depending on the implementation, the user-selected tool may be an edge tool, a pixel count tool, a blob tool, a brightness tool, a contrast tool, a binarize tool, etc. as described above with regard to FIGS. 3A-3D. In some implementations, a user may indicate the ROI to the user computing device 102 by clicking and dragging to create the perimeter of the ROI in the image display (e.g., as seen in FIGS. 3A-3D). In further implementations, a user may indicate the ROI by clicking in a location in the image display to generate the ROI perimeter and may subsequently modify the ROI perimeter by clicking and dragging. In still further implementations, the user computing device 102 may generate a default ROI when the user selects a tool and allow the user to confirm the ROI, modify the ROI perimeter, etc. Depending on the implementation, the user computing device 102 may similarly receive the indication of the ROI using other such techniques.

At block 408 the user computing device 102 determines what the user-selected tool is set to use in generating an output image for the user: (i) a bank image, (ii) an output of a parent tool (e.g., the output of a binarize tool), or (iii) an output of the user-selected tool (e.g., a filter tool). Depending on what the user-selected tool uses, flow continues to one of blocks 410, 412, or 414. In particular, if the user-selected tool is set to use the bank image, then flow continues to block 410. If the user-selected tool is set to use the output of a parent tool, then flow continues to block 412. If the user-selected tool is set to use the output of the tool itself (i.e., the tool is largely designed to display a visual change to the user), then flow continues to block 414.

At each of blocks 410, 412, and 414, the user computing device 102 generates a display image for the user based on the underlying image determined in block 408. At block 410, the user computing device 102 generates the display image such that the image is representative of the bank image. As such, the display image displays the underlying bank image upon which the operation is performed. In some implementations, changes to the underlying bank image may also cause the computing device 102 to generate a new and/or modified display image representative of the changes to the bank image. For example, if the user changes the tool to use a light bank image rather than a dark bank image, the user computing device 102 may generate a new and/or modified display image representative of the light bank image. As another example, if the imaging device 104 captures and/or generates a new bank image to replace the original bank image, the user computing device 102 may automatically (or in response to a user indication) replace the original display image with a new display image. In other implementations, the user computing device 102 may prevent the imaging device 104 from capturing and/or generating further bank images, the user from selecting a new bank image, etc. once the user computing device 102 generates the display image until the user indicates a job is done, deletes the display image, etc.

At block 412, the user computing device 102 generates the display image such that the image is representative of the output of the parent tool. As such, the display image displays the already modified imagery that the tool operates on. At block 414, the user computing device 102 generates the display image such that the image is representative of the output of the user-selected tool. As such, the display image displays the output of the actual tool that the user is operating.

In some implementations, changes to the underlying parent tool, an ancestor tool from which the parent tool descends, or the bank image with which the parent tool is associated may also cause the computing device 102 to generate a new and/or modified display image representative of the changes, similar to the implementations described above with regard to block 410. In further implementations, the user computing device 102 stores user changes (such as in a temporary memory), but doesn't implement the changes to generate a new and/or modified display image until the user computing device 102 receives an indication from the user to do so. For example, if the user modifies the ancestor tool and the parent tool, the user computing device 102 may wait until the user hits a "confirm" or "generate" button before generating the new display image. In further implementations, the user computing device 102 generates the new display image but doesn't render the image for the user until receiving an indication as described above. In still other implementations, the user computing device 102 automatically generates and/or renders display images to reflect changes in real time or near real time.

In some implementations, the user-selected tool (e.g., a blob tool, an edge tool, a pixel count tool, etc.) generates visual metadata (i.e., metadata representative of what a human eye may see). For example, a blob tool may generate data representative of characters, pictures, etc. that a human observer may see. In such implementations, the user computing device 102 may further render the visual metadata in the ROI. Depending on the implementation, the user computing device 102 may render the visual metadata in the ROI such that the visual metadata overlays the output of the parent tool or the bank image within the ROI. For example, in the exemplary embodiment of FIG. 3D, the user computing device 102 displays the visual metadata resulting from the blob count tool over the portions of the barcode and characters visible in the bright bank with which the blob tool is associated.

In some implementations, the ROI is at least partially outside of a tool boundary associated with a parent tool. In some such implementations, the user computing device 102 renders the portion of the display image in the ROI such that the display image is representative of (i) the output of the parent tool within the tool boundary associated with the parent tool and (ii) the bank image outside of the tool boundary associated with the parent tool. For example, if the ROI for a tool such as a blob count tool (e.g., a tool that highlights text or dark imagery on a light background) that depends from a binarize tool (e.g., a tool that increases contrast between light portions and dark portions of the image), but the ROI for the blob count tool extends beyond the ROI for the parent binarize tool. As such, the display image within the blob tool ROI shows the binarize image where overlap exists and the bank image where overlap does not exist.

In some implementations, the user computing device 102 only generates the display image in the ROI under predetermined circumstances. For example, in some such implementations, the user computing device 102 only generates the display image when the imaging device 104 (e.g., a fixed industrial scanner) is not operating in a deploy mode. In some implementations, the imaging device 104 operates in a deploy mode when the imaging device 104 is prepared to receive an indication from the user computing device 102 to capture a bank image, modify a bank image, etc.

Although FIG. 4 is described with regard to the user computing device 102, it will be understood that the user computing device 102 may instead transmit information for capturing images to the imaging device 104. In such implementations, the imaging device may capture, generate, and cause the user computing device 102 to render the display image as described herein. In some such implementations, the imaging device 104 automatically transfers the generated images to the user computing device 102. In further implementations, the imaging device 104 stores the images on a memory belonging to the imaging device 104 so the user computing device 102 may later request the images for rendering and/or display.

Referring next to FIG. 5, the method 500 illustrates a flow diagram of another example method for analyzing an image using ROI windows that display important information to a user when a tool cannot display the information the tool would normally display according to method 400. Although the method 500 is described below with regard to user computing device 102 and components thereof as illustrated in FIG. 1, it will be understood that other similarly suitable imaging devices and components may be used instead.

In some implementations, the method 500 occurs after one of blocks 412 or 414 in method 400. As such, in such implementations, the method 500 only occurs when a user-selected tool is set to use an output of a parent tool or the output of the user-selected tool in question as described with regard to blocks 412 and/or 414 above. Depending on the implementation, when the user-selected tool uses a bank image at block 410, then the user computing device 102 may display an error message, prevent the user-selected tool from being used, or otherwise alert a user of the error.

At block 502, the user computing device 102 determines that the output of the parent tool or the output of the user-selected tool is not available. In some implementations, the output of the parent tool or the output of the user-selected tool is not available when the parent tool or the user-selected tool is running a job. In further implementations, the output of the parent tool or the output of the user-selected tool is not available when a job associated with the parent tool or the user-selected tool has failed to run. For example, a binarize or blob count tool descending from a parent filter tool being implemented on runtime while imaging device 104 is capturing a filtered image or after failing to capture a filtered image may not be able to display and operate on the output of the filter tool. As such, the user computing device 102 may instead display the output of an ancestor tool or a bank image as discussed below.

At block 504, the user computing device 102 determines whether the output of a nearest ancestor tool is available. If so, then flow proceeds to block 506. Otherwise, flow proceeds to decision block 508. In some implementations, determination of the output of the nearest ancestor tool functions similarly to determination of the output of the parent tool and/or the output of the user-selected tool as described above with regard to block 502. As such, depending on the implementation, the user computing device 102 may determine that the output of the nearest ancestor tool is unavailable when the nearest ancestor tool is running a job, the nearest ancestor tool does not have an image output, a job associated with the nearest ancestor tool failed to run, etc.

At block 506, the user computing device 102 generates at least a portion of a display image in the ROI representative of an output of the nearest ancestor tool, similar to block 412 of FIG. 4. In some implementations, changes to the underlying parent tool, an ancestor tool from which the parent tool descends, or the bank image with which the parent tool is associated may also cause the computing device 102 to generate a new and/or modified display image representative of the changes, similar to the implementations described above with regard to block 410. In further implementations, the user computing device 102 stores user changes (such as in a temporary memory), but doesn't implement the changes to generate a new and/or modified display image until the user computing device 102 receives an indication from the user to do so. For example, if the user modifies the ancestor tool and the parent tool, the user computing device 102 may wait until the user hits a "confirm" or "generate" button before generating the new display image. In further implementations, the user computing device 102 generates the new display image but doesn't render the image for the user until receiving an indication as described above. In still other implementations, the user computing device 102 automatically generates and/or renders display images to reflect changes in real time or near real time.

At block 508, the user computing device 102 determines whether the nearest ancestor tool has a parent tool. If so, then flow proceeds to block 510. Otherwise, flow proceeds to block 512. At block 510, the user computing device 102 determines to use the parent tool as the nearest ancestor tool and flow loops back to decision block 504. As such, the user computing device 102 recursively checks through the list of ancestors for a tool until the user computing device 102 either reaches a tool that the user computing device 102 can use to generate the display image or reaches the bank image from which the entire lineage of tools descends.

At block 512, the user computing device 102 generates at least a portion of a display image in the ROI representative of the bank image. In some implementations, the user computing device 102 generates the display image similarly to block 410 of FIG. 4. As such, implementations as described with regard to FIG. 4 may apply to block 508 as appropriate.

Depending on the implementation, the user computing device 102 may further determine whether bank image is available. In such implementations, the user computing device 102 may generate the display image in the ROI representative of the bank image after determining that the bank image is available. In further such implementations, the user computing device 102 may display an error to the user if the bank image is unavailable.

Although FIG. 5 is described with regard to the user computing device 102, it will be understood that the user computing device 102 may instead transmit information for capturing images to the imaging device 104. In such implementations, the imaging device may capture, generate, and cause the user computing device 102 to render the display image as described herein. In some such implementations, the imaging device 104 automatically transfers the generated images to the user computing device 102. In further implementations, the imaging device 104 stores the images on a memory belonging to the imaging device 104 so the user computing device 102 may later request the images for rendering and/or display.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. A method for analyzing an image taken by a fixed industrial scanner system, the fixed industrial scanner system including a computing device executing an application and an imaging device communicatively coupled to the computing device, the method comprising:
   receiving, by one or more processors, a bank image from the imaging device pursuant to one of a plurality of banks of imaging parameters, each of the plurality of banks of imaging parameters being different from each other of the plurality of banks of imaging parameters;
   rendering, by the one or more processors, the bank image in an image display;
   receiving, by the one or more processors, an indication of a region of interest (ROI) in the image display associated with a user-selected tool, the ROI encapsulating a region of the image display;
   determining, by the one or more processors, whether the user-selected tool is set to use the bank image, an output of a parent tool, or an output of the user-selected tool; and
   generating, by the one or more processors and in the image display, at least a portion of a display image in the ROI representative of:
      (i) the bank image when the user-selected tool is set to use the bank image,
      (ii) the output of the parent tool when the user-selected tool is set to use the output of the parent tool, or
      (iii) the output of the user-selected tool when the user-selected tool is set to use the output of the user-selected tool.

2. The method of claim 1, the method further comprising:
   rendering visual metadata generated by the user-selected tool such that the visual metadata overlays the output of the parent tool or the bank image.

3. The method of claim 1, the method further comprising:
   determining that the ROI is at least partially outside of a tool boundary associated with the parent tool; and
   responsive to the determining that the ROI is at least partially outside of the tool boundary, rendering the at least the portion of the display image in the ROI such that the display image is representative of:
      (a) the output of the parent tool within the tool boundary associated with the parent tool; and
      (b) the bank image outside of the tool boundary associated with the parent tool.

4. The method of claim 1, the method further comprising:
   determining that the output of the parent tool or the output of the user-selected tool is not available; and
   generating, in the image display, at least a portion of a display image in the ROI representative of:
      (iv) an output of nearest ancestor tool when (a) the user-selected tool is set to use the output of the parent tool and the output of the parent tool is not available or (b) the user-selected tool is set to use the output of the user-selected tool and the output of the user-selected tool is not available.

5. The method of claim 4, wherein the output of the parent tool or the output of the user-selected tool is not available when the parent tool or the user-selected tool is running a job.

6. The method of claim 4, wherein the output of the parent tool or the output of the user-selected tool is not available when a job associated with the parent tool or the user-selected tool failed to run.

7. The method of claim 4, the method further comprising:
determining that the output of the nearest ancestor tool is not available; and
generating, in the image display, at least a portion of a display image in the ROI representative of:
(v) the bank image when (a) the user-selected tool is set to use the output of the parent tool and the output of the parent tool and the output of the nearest ancestor tool are not available or (b) the user-selected tool is set to use the output of the user-selected tool and the output of the user-selected tool and the output of the nearest ancestor tool are not available.

8. The method of claim 7, wherein the output of the nearest ancestor tool is not available when the nearest ancestor tool does not have an image output.

9. The method of claim 1, wherein the plurality of banks of imaging parameters include at least a light bank and a dark bank, the light bank having a higher brightness parameter than the dark bank.

10. The method of claim 1, wherein the bank image is a first bank image of a plurality of bank images, each bank image of the plurality of bank images corresponding to a different bank of the plurality of banks, the method further comprising:
receiving each bank image of the plurality of bank images from the imaging device pursuant to each corresponding bank of the plurality of banks of imaging parameters.

11. The method of claim 10, wherein the receiving each bank image of the plurality of bank images is responsive to an indication from the user.

12. The method of claim 1, wherein the bank image is a first bank image of a plurality of bank images, each bank image of the plurality of bank images corresponding to a different bank of the plurality of banks associated with a tool, the method further comprising:
receiving each bank image of the plurality of bank images from the imaging device pursuant to each corresponding bank of the plurality of banks of imaging parameters.

13. The method of claim 1, further comprising:
determining that the fixed industrial scanner is not operating in a deploy mode;
wherein the generating the at least a portion of the display image in the ROI is responsive to the determining.

14. A fixed industrial scanner system comprising:
one or more processors of a computing device executing an application, the application operable to analyze an image taken by a fixed industrial scanner system; and
computer-readable media storing machine readable instructions that, when executed, cause the one or more processors to:
receive a bank image from the imaging device pursuant to one of a plurality of banks of imaging parameters, each of the plurality of banks of imaging parameters being different from each other of the plurality of banks of imaging parameters;
render the bank image in an image display;
receive an indication of a region of interest (ROI) in the image display associated with a user-selected tool, the ROI encapsulating a region of the image display;
determine whether the user-selected tool is set to use the bank image, an output of a parent tool, or an output of the user-selected tool; and
generate, in the image display, at least a portion of a display image in the ROI representative of:
(i) the bank image when the user-selected tool is set to use the bank image,
(ii) the output of the parent tool when the user-selected tool is set to use the output of the parent tool, or
(iii) the output of the user-selected tool when the user-selected tool is set to use the output of the user-selected tool.

15. The fixed industrial scanner system of claim 14, wherein the machine readable instructions include instructions that, when executed, cause the one or more processors to further:
render visual metadata generated by the user-selected tool such that the visual metadata overlays the output of the parent tool or the bank image.

16. The fixed industrial scanner system of claim 14, wherein the machine readable instructions include instructions that, when executed, cause the one or more processors to further:
determine that the ROI is at least partially outside of a tool boundary associated with the parent tool; and
responsive to the determining that the ROI is at least partially outside of the tool boundary, render the at least the portion of the display image in the ROI such that the display image is representative of:
(a) the output of the parent tool within the tool boundary associated with the parent tool; and
(b) the bank image outside of the tool boundary associated with the parent tool.

17. The fixed industrial scanner system of claim 14, wherein the machine readable instructions include instructions that, when executed, cause the one or more processors to further:
determine that the output of the parent tool or the output of the user-selected tool is not available; and
generate, in the image display, at least a portion of a display image in the ROI representative of:
(iv) an output of nearest ancestor tool when (a) the user-selected tool is set to use the output of the parent tool and the output of the parent tool is not available or (b) the user-selected tool is set to use the output of the user-selected tool and the output of the user-selected tool is not available.

18. The fixed industrial scanner system of claim 17, wherein the output of the parent tool or the output of the user-selected tool is not available when the parent tool or the user-selected tool is running a job.

19. The fixed industrial scanner system of claim 17, wherein the output of the parent tool or the output of the user-selected tool is not available when a job associated with the parent tool or the user-selected tool failed to run.

20. The fixed industrial scanner system of claim 17, wherein the machine readable instructions include instructions that, when executed, cause the one or more processors to further:
determine that the output of the nearest ancestor tool is not available; and generate, in the image display, at least a portion of a display image in the ROI representative of:

(v) the bank image when (a) the user-selected tool is set to use the output of the parent tool and the output of the parent tool and the output of the nearest ancestor tool are not available or (b) the user-selected tool is set to use the output of the user-selected tool and the output of the user-selected tool and the output of the nearest ancestor tool are not available.

21. The fixed industrial scanner system of claim 20, wherein the output of the nearest ancestor tool is not available when the nearest ancestor tool does not have an image output.

22. The fixed industrial scanner system of claim 14, wherein the plurality of banks of imaging parameters include at least a light bank and a dark bank, the light bank having a higher brightness parameter than the dark bank.

23. The fixed industrial scanner system of claim 14, wherein the bank image is a first bank image of a plurality of bank images, each bank image of the plurality of bank images corresponding to a different bank of the plurality of banks, and the machine readable instructions include instructions that, when executed, cause the one or more processors to further:

receiving each bank image of the plurality of bank images from the imaging device pursuant to each corresponding bank of the plurality of banks of imaging parameters.

24. The fixed industrial scanner system of claim 23, wherein the receiving each bank image of the plurality of bank images is responsive to an indication from the user.

25. The fixed industrial scanner system of claim 14, wherein the bank image is a first bank image of a plurality of bank images, each bank image of the plurality of bank images corresponding to a different bank of the plurality of banks associated with a tool, and the machine readable instructions include instructions that, when executed, cause the one or more processors to further:

receiving each bank image of the plurality of bank images from the imaging device pursuant to each corresponding bank of the plurality of banks of imaging parameters.

26. The fixed industrial scanner system of claim 14, wherein the machine readable instructions include instructions that, when executed, cause the one or more processors to further:

determining that the fixed industrial scanner is not operating in a deploy mode;

wherein the generating the at least a portion of the display image in the ROI is responsive to the determining.

* * * * *